US009464886B2

(12) United States Patent
Salter et al.

(10) Patent No.: US 9,464,886 B2
(45) Date of Patent: Oct. 11, 2016

(54) LUMINESCENT HITCH ANGLE DETECTION COMPONENT

(71) Applicant: Ford Global Technologies, LLC, Dearborn, MI (US)

(72) Inventors: Stuart C. Salter, White Lake, MI (US); Erick Michael Lavoie, Dearborn, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/820,999

(22) Filed: Aug. 7, 2015

(65) Prior Publication Data

US 2015/0345938 A1 Dec. 3, 2015

Related U.S. Application Data

(63) Continuation-in-part of application No. 14/603,636, filed on Jan. 23, 2015, which is a continuation-in-part of application No. 14/086,442, filed on Nov. 21, 2013.

(51) Int. Cl.
*B60Q 1/00* (2006.01)
*B60Q 3/00* (2006.01)
(Continued)

(52) U.S. Cl.
CPC ............... *G01B 11/272* (2013.01); *B60D 1/00* (2013.01); *B60Q 1/22* (2013.01); *B60Q 1/305* (2013.01);
(Continued)

(58) Field of Classification Search
CPC .......... B60D 1/00; B60D 1/22; B60D 1/305; B60D 1/36; B60Q 3/06; F21S 48/00; F21S 48/214; F21S 48/215; F21S 48/2212
USPC ................................ 362/485, 487, 509–510
See application file for complete search history.

(56) References Cited

U.S. PATENT DOCUMENTS 4,430,637 A 2/1984 Koch-Ducker et al.
5,056,905 A 10/1991 Jensen
(Continued)

FOREIGN PATENT DOCUMENTS

CN 101337492 A 1/2009
CN 201169230 Y 2/2009
(Continued)

OTHER PUBLICATIONS

Gouet-Brunet, V.; Lameyre, B., "Object recognition and segmentation in videos by connecting heterogeneous visual features", Computer Vision and Image Understanding, Jul. 2008, 2 pgs., vol. 111, Issue 1.
(Continued)

*Primary Examiner* — Hason Moon Han
(74) *Attorney, Agent, or Firm* — Vichit Chea; Price Heneveld LLP

(57) ABSTRACT

A lighting system for a trailer is provided herein. The lighting system may include a hitch angle detection component disposed on the trailer. A light source is disposed on the vehicle. A photoluminescent structure is disposed on the hitch angle detection component and configured to luminesce in response to excitation by the light source. The hitch angle detection component may further include a predetermined image pattern of a certain size and shape provided on the top surface thereof for capture by an imaging device and recognition by an image processing unit.

20 Claims, 8 Drawing Sheets

(51) Int. Cl.
*G01B 11/27* (2006.01)
*H05B 37/02* (2006.01)
*B60D 1/00* (2006.01)
*B60Q 1/22* (2006.01)
*B60Q 1/30* (2006.01)
*F21S 8/10* (2006.01)

(52) U.S. Cl.
CPC ......... *F21S 48/214* (2013.01); *H05B 37/0218* (2013.01); *H05B 37/0227* (2013.01); *Y02B 20/46* (2013.01)

(56) References Cited

U.S. PATENT DOCUMENTS 5,142,278 A 8/1992 Moallemi et al.
5,442,810 A 8/1995 Jenquin
5,455,557 A 10/1995 Noll et al.
5,521,633 A 5/1996 Nakajima et al.
5,709,453 A 1/1998 Krent et al.
5,905,433 A 5/1999 Wortham
5,951,035 A 9/1999 Phillips, Jr. et al.
5,970,619 A 10/1999 Wells
6,100,795 A 8/2000 Otterbacher et al.
6,117,362 A 9/2000 Yen et al.
6,151,175 A 11/2000 Osha
6,178,650 B1 1/2001 Thibodeaux
6,217,177 B1 4/2001 Rost
6,318,747 B1 11/2001 Ratican
6,480,104 B1 11/2002 Wall et al.
6,498,440 B2 * 12/2002 Stam .................. H05B 33/0818 315/291
6,577,073 B2 * 6/2003 Shimizu .............. H01L 25/0753 257/89
6,729,738 B2 5/2004 Fuwausa et al.
6,737,964 B2 5/2004 Samman et al.
6,773,129 B2 8/2004 Anderson, Jr. et al.
6,820,888 B1 * 11/2004 Griffin ..................... B60D 1/36 116/28 R
6,837,432 B2 1/2005 Tsikos et al.
6,851,840 B2 2/2005 Ramamurthy et al.
6,859,148 B2 2/2005 Miller
6,871,986 B2 3/2005 Yamanaka et al.
6,953,536 B2 10/2005 Yen et al.
6,990,922 B2 1/2006 Ichikawa et al.
7,005,974 B2 2/2006 McMahon et al.
7,008,088 B2 * 3/2006 Pisciotti ................. B60Q 1/305 362/485
7,036,840 B2 5/2006 Kwilinski
7,039,504 B2 5/2006 Tanaka et al.
7,161,472 B2 1/2007 Strumolo et al.
7,204,504 B2 4/2007 Gehring et al.
7,213,923 B2 5/2007 Liu et al.
7,237,790 B2 7/2007 Gehring et al.
7,264,366 B2 9/2007 Hulse
7,264,367 B2 9/2007 Hulse
7,309,075 B2 12/2007 Ramsey et al.
7,441,914 B2 10/2008 Palmer et al.
7,619,680 B1 11/2009 Bingle et al.
7,744,109 B2 6/2010 Groh
7,745,818 B2 6/2010 Sofue et al.
7,753,541 B2 7/2010 Chen et al.
7,760,077 B2 7/2010 Day
7,834,548 B2 11/2010 Jousse et al.
7,862,220 B2 1/2011 Cannon et al.
7,987,030 B2 7/2011 Flores et al.
8,010,252 B2 8/2011 Getman et al.
8,016,465 B2 9/2011 Egerer et al.
8,022,818 B2 9/2011 la Tendresse et al.
8,038,166 B1 10/2011 Piesinger
8,044,776 B2 10/2011 Schofield et al.
8,068,019 B2 11/2011 Bennie et al.
8,071,988 B2 12/2011 Lee et al.
8,097,843 B2 1/2012 Agrawal et al.
8,136,425 B2 3/2012 Bostick
8,163,201 B2 4/2012 Agrawal et al.
8,165,770 B2 4/2012 Getman et al.
8,178,852 B2 5/2012 Kingsley et al.
8,179,238 B2 5/2012 Roberts, Sr. et al.
8,191,915 B2 6/2012 Freese, V et al.
8,197,105 B2 * 6/2012 Yang ....................... A47F 3/001 362/217.05
8,203,260 B2 6/2012 Li et al.
8,207,511 B2 6/2012 Bortz et al.
8,232,533 B2 7/2012 Kingsley et al.
8,247,761 B1 8/2012 Agrawal et al.
8,286,378 B2 10/2012 Martin et al.
8,332,097 B2 12/2012 Chiba et al.
8,362,888 B2 1/2013 Roberts, Sr. et al.
8,390,696 B2 3/2013 Komoto et al.
8,408,766 B2 4/2013 Wilson et al.
8,415,642 B2 4/2013 Kingsley et al.
8,421,811 B2 4/2013 Odland et al.
8,451,107 B2 5/2013 Lu et al.
8,466,438 B2 6/2013 Lambert et al.
8,519,359 B2 8/2013 Kingsley et al.
8,519,362 B2 8/2013 Labrot et al.
8,552,848 B2 10/2013 Rao et al.
8,606,430 B2 12/2013 Seder et al.
8,624,716 B2 1/2014 Englander
8,631,598 B2 1/2014 Li et al.
8,664,624 B2 3/2014 Kingsley et al.
8,683,722 B1 4/2014 Cowan
8,724,054 B2 5/2014 Jones
8,755,984 B2 6/2014 Rupp et al.
8,773,012 B2 7/2014 Ryu et al.
8,836,786 B2 9/2014 Seger et al.
8,846,184 B2 9/2014 Agrawal et al.
8,930,140 B2 1/2015 Trombley et al.
8,952,341 B2 2/2015 Kingsley et al.
9,042,603 B2 5/2015 Elwart et al.
9,057,021 B2 6/2015 Kingsley et al.
9,065,447 B2 6/2015 Buttolo et al.
9,299,887 B2 3/2016 Lowenthal et al.
9,315,151 B2 4/2016 Taylor et al.
9,315,212 B1 4/2016 Kyrtsos et al.
9,335,162 B2 5/2016 Kyrtsos et al.
2001/0024333 A1 9/2001 Rost
2002/0149673 A1 * 10/2002 Hirama ..................... B60R 1/00 348/118
2002/0159741 A1 10/2002 Graves et al.
2002/0163792 A1 11/2002 Formoso
2003/0179548 A1 9/2003 Becker et al.
2003/0234512 A1 12/2003 Holub
2004/0207525 A1 10/2004 Wholey et al.
2004/0213088 A1 10/2004 Fuwausa
2005/0074143 A1 4/2005 Kawai
2005/0128059 A1 6/2005 Vause
2006/0071447 A1 4/2006 Gehring et al.
2006/0087826 A1 4/2006 Anderson, Jr.
2006/0171704 A1 8/2006 Bingle et al.
2006/0250501 A1 11/2006 Widmann et al.
2007/0032319 A1 2/2007 Tufte
2007/0132560 A1 6/2007 Nystrom et al.
2007/0285808 A1 12/2007 Beale
2007/0285938 A1 12/2007 Palmer et al.
2008/0180526 A1 7/2008 Trevino
2008/0231701 A1 9/2008 Greenwood et al.
2008/0231707 A1 9/2008 Fontana
2009/0093928 A1 4/2009 Getman et al.
2009/0219730 A1 9/2009 Syfert et al.
2009/0231441 A1 9/2009 Walker et al.
2009/0251920 A1 10/2009 Kino et al.
2009/0262515 A1 10/2009 Lee et al.
2009/0271078 A1 10/2009 Dickinson
2010/0156667 A1 6/2010 Bennie et al.
2010/0324770 A1 12/2010 Ramsey et al.
2011/0012062 A1 1/2011 Agrawal et al.
2011/0025482 A1 2/2011 Algueera et al.
2011/0050903 A1 3/2011 Vorobiev
2011/0216199 A1 9/2011 Trevino et al.
2011/0257860 A1 10/2011 Getman et al.
2012/0001406 A1 1/2012 Paxton et al.
2012/0041658 A1 2/2012 Turner
2012/0104954 A1 5/2012 Huang

(56) References Cited

U.S. PATENT DOCUMENTS

| | | | |
|---|---|---|---|
| 2012/0183677 | A1 | 7/2012 | Agrawal et al. |
| 2012/0185131 | A1 | 7/2012 | Headley |
| 2012/0191285 | A1 | 7/2012 | Woolf et al. |
| 2012/0200706 | A1 | 8/2012 | Greenwood et al. |
| 2012/0265416 | A1 | 10/2012 | Lu et al. |
| 2012/0271512 | A1 | 10/2012 | Rupp et al. |
| 2012/0271514 | A1 | 10/2012 | Lavoie et al. |
| 2012/0271515 | A1 | 10/2012 | Rhode et al. |
| 2012/0280528 | A1 | 11/2012 | Dellock et al. |
| 2012/0288156 | A1 | 11/2012 | Kido |
| 2013/0141578 | A1 | 6/2013 | Chundrlik, Jr. et al. |
| 2013/0158803 | A1 | 6/2013 | Headley |
| 2013/0207834 | A1 | 8/2013 | Mizutani et al. |
| 2013/0226390 | A1 | 8/2013 | Luo et al. |
| 2013/0268160 | A1 | 10/2013 | Trombley et al. |
| 2013/0335994 | A1 | 12/2013 | Mulder et al. |
| 2014/0005918 | A1 | 1/2014 | Qiang |
| 2014/0052337 | A1 | 2/2014 | Lavoie et al. |
| 2014/0058614 | A1 | 2/2014 | Trombley et al. |
| 2014/0058622 | A1 | 2/2014 | Trombley et al. |
| 2014/0058655 | A1 | 2/2014 | Trombley et al. |
| 2014/0058668 | A1 | 2/2014 | Trombley et al. |
| 2014/0065442 | A1 | 3/2014 | Kingsley et al. |
| 2014/0085472 | A1 | 3/2014 | Lu et al. |
| 2014/0103258 | A1 | 4/2014 | Agrawal et al. |
| 2014/0160276 | A1 | 6/2014 | Pliefke et al. |
| 2014/0172232 | A1 | 6/2014 | Rupp et al. |
| 2014/0188344 | A1 | 7/2014 | Lavoie |
| 2014/0200759 | A1 | 7/2014 | Lu et al. |
| 2014/0210456 | A1 | 7/2014 | Crossman |
| 2014/0218506 | A1 | 8/2014 | Trombley et al. |
| 2014/0218522 | A1 | 8/2014 | Lavoie et al. |
| 2014/0222288 | A1 | 8/2014 | Lavoie et al. |
| 2014/0236532 | A1 | 8/2014 | Trombley et al. |
| 2014/0249691 | A1 | 9/2014 | Hafner et al. |
| 2014/0264396 | A1 | 9/2014 | Lowenthal et al. |
| 2014/0266666 | A1 | 9/2014 | Habibi |
| 2014/0267688 | A1 | 9/2014 | Aich et al. |
| 2014/0267689 | A1 | 9/2014 | Lavoie |
| 2014/0277942 | A1 | 9/2014 | Kyrtsos et al. |
| 2014/0297128 | A1 | 10/2014 | Lavoie et al. |
| 2014/0297129 | A1 | 10/2014 | Lavoie et al. |
| 2014/0303847 | A1 | 10/2014 | Lavoie |
| 2014/0307095 | A1 | 10/2014 | Wierich |
| 2014/0309888 | A1 | 10/2014 | Smit et al. |
| 2014/0324295 | A1 | 10/2014 | Lavoie |
| 2014/0343795 | A1 | 11/2014 | Lavoie |
| 2014/0354811 | A1 | 12/2014 | Weber |
| 2014/0373898 | A1 | 12/2014 | Rogers et al. |
| 2014/0379217 | A1 | 12/2014 | Rupp et al. |
| 2015/0046027 | A1 | 2/2015 | Sura et al. |
| 2015/0057903 | A1 | 2/2015 | Rhode et al. |
| 2015/0066296 | A1 | 3/2015 | Trombley et al. |
| 2015/0120141 | A1 | 4/2015 | Lavoie et al. |
| 2015/0134183 | A1 | 5/2015 | Lavoie et al. |
| 2015/0138340 | A1 | 5/2015 | Lavoie |
| 2015/0138789 | A1 | 5/2015 | Singer et al. |
| 2015/0158527 | A1 | 6/2015 | Hafner et al. |
| 2015/0172582 | A1 | 6/2015 | Kiyohara et al. |
| 2015/0203156 | A1 | 7/2015 | Hafner et al. |
| 2015/0210317 | A1 | 7/2015 | Hafner et al. |
| 2015/0217693 | A1 | 8/2015 | Pliefke et al. |
| 2015/0267881 | A1 | 9/2015 | Salter et al. |
| 2015/0269444 | A1 | 9/2015 | Lameyre et al. |
| 2016/0016506 | A1 | 1/2016 | Collins et al. |
| 2016/0023603 | A1 | 1/2016 | Vico et al. |
| 2016/0152263 | A1 | 6/2016 | Singh et al. |

FOREIGN PATENT DOCUMENTS

| | | | |
|---|---|---|---|
| CN | 201193011 | Y | 2/2009 |
| CN | 101610420 | A | 12/2009 |
| DE | 3931518 | A1 | 4/1991 |
| DE | 9208595 | U1 | 8/1992 |
| DE | 29708699 | U1 | 7/1997 |
| DE | 10030738 | C1 | 8/2001 |
| DE | 10122562 | C1 | 7/2002 |
| DE | 10154612 | A1 | 5/2003 |
| DE | 10312548 | B3 | 5/2004 |
| DE | 10319396 | A1 | 11/2004 |
| DE | 102006056408 | A1 | 6/2008 |
| EP | 0418653 | A1 | 3/1991 |
| EP | 1312492 | A2 | 5/2003 |
| EP | 1793261 | A1 | 6/2007 |
| EP | 2644477 | A1 | 10/2013 |
| EP | 2778209 | A1 | 9/2014 |
| JP | 2000159011 | A | 6/2000 |
| JP | 2002012172 | A | 1/2002 |
| JP | 2002068032 | A | 3/2002 |
| JP | 3716722 | B2 | 11/2005 |
| JP | 2007238063 | A | 9/2007 |
| JP | 2009171122 | A | 7/2009 |
| JP | 2012166647 | A | 9/2012 |
| WO | 2006042665 | A1 | 4/2006 |
| WO | 2006047306 | A1 | 5/2006 |
| WO | 2012103193 | A1 | 8/2012 |
| WO | 2013048994 | A1 | 4/2013 |
| WO | 2013070539 | A1 | 5/2013 |
| WO | 2014068440 | A1 | 5/2014 |

OTHER PUBLICATIONS

Alpine Electronics of America, Inc., “Alpine Electronics Introduces Two New Driver Assist Solutions”, press release, Jan. 7, 2010, 2 pgs., Torrance, California.

Wagner, M.; Zobel, D.; Meroth, A., “An Adaptive Software and Systems Architecture for Drivers Assistance Systems based on Service Orientation”, International Journal of Machine Learning and Computing, Oct. 2011, pp. 359-366, vol. 1, No. 4, Germany.

“Rearview Parking Assist Systems”, Donmar Sunroofs & Accessories, Brochure, Aug. 2013, 13 pgs.

“Trailer Vision”, Trailer Vision Ltd., Brochure, www.trailervision.co.uk, Date Unknown, 4 pgs.

* cited by examiner

LUMINESCENT HITCH ANGLE DETECTION COMPONENT

CROSS-REFERENCE TO RELATED APPLICATIONS

This application is a continuation-in-part of U.S. patent application Ser. No. 14/603,636, filed Jan. 23, 2015, entitled "DOOR ILLUMINATION AND WARNING SYSTEM" which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference as if fully set forth herein.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a lighting system for a trailer towed by a vehicle is disclosed. The lighting system includes a hitch angle detection component disposed on the trailer. A light source is disposed on the vehicle. A photoluminescent structure is disposed on the hitch angle detection component and is configured to luminesce in response to excitation by the light source.

According to another aspect of the present invention, a lighting system is disclosed. The lighting system includes a light source. A target assembly having a first luminescent structure thereon is configured to luminesce in response to excitation by at least a portion of the light source.

According to yet another aspect of the present invention, a lighting system for a trailer assembly having a trailer towed by a vehicle is disclosed. The lighting system includes a hitch angle detection component located on the trailer having a predefined pattern thereon. A light source is powered by a vehicle. A photoluminescent structure disposed on the detection component. The photoluminescent structure is configured to luminesce in response to excitation by light output from at least a portion of the light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
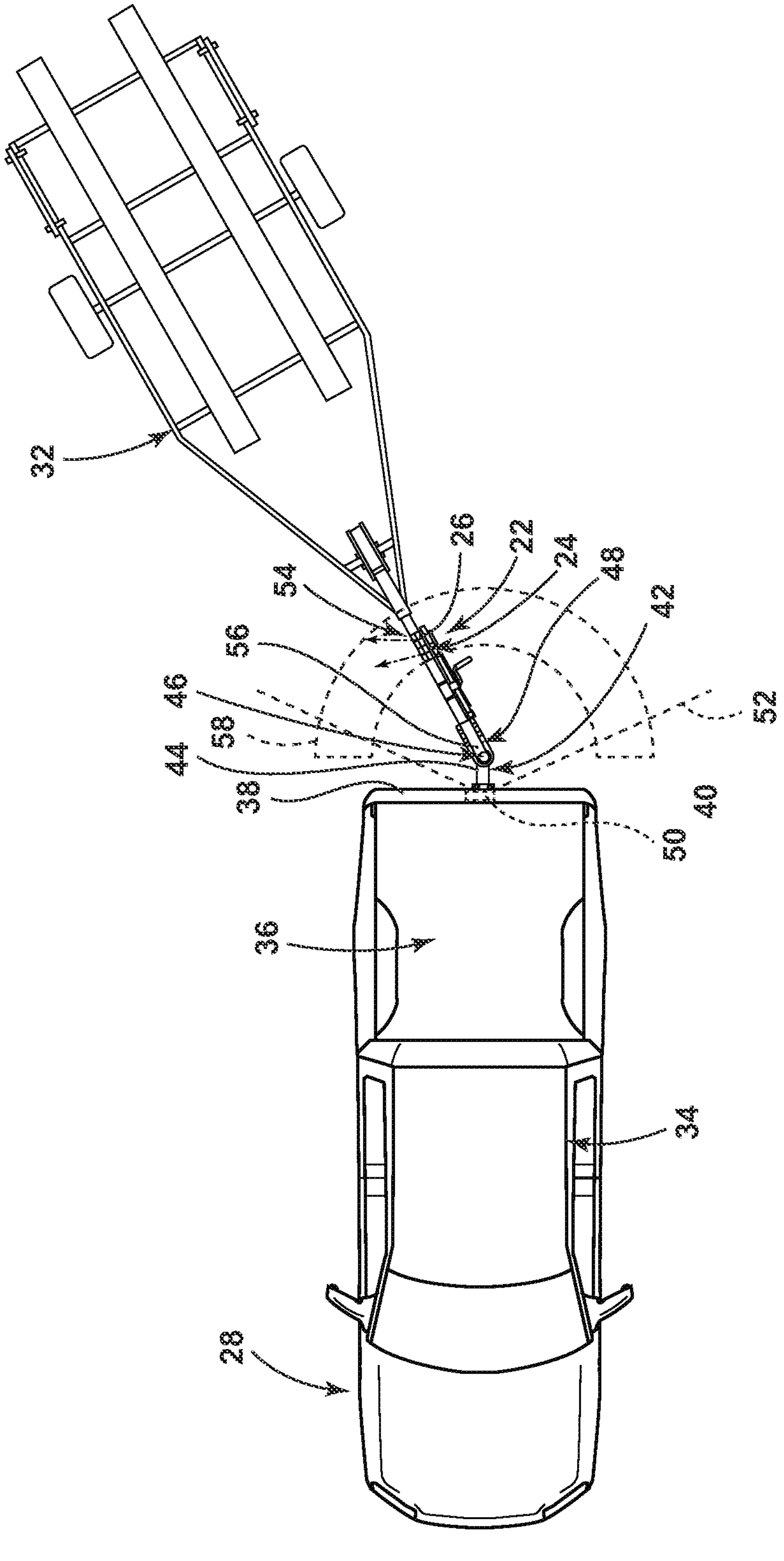
FIG. 2 is a top plan view of a trailer attached to a vehicle equipped with a lighting system employed on a hitch angle detection component, according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system configured as a hitch angle detection component that cooperates with a vehicle to illuminate an area and/or in a pre-defined pattern for recognition by the vehicle. The lighting system may advantageously employ one or more photoluminescent structures to illuminate in response to pre-defined events. The one or more photoluminescent structures may be configured to convert light received from an associated light source and re-emit the light at a different wavelength typically found in the visible spectrum.

The lighting system may be configured to cooperate with a vehicle implementing trailer backup assist functionality. In particular, such trailer backup assist functionality provides for controlling curvature of a path of travel of a trailer attached to a vehicle (i.e., trailer path curvature control) by allowing a driver of the vehicle to specify a desired path of the trailer by inputting a desired trailer path curvature as the backup maneuver of the vehicle and trailer progresses. The trailer backup assist system may automatically steer the vehicle-trailer combination as a driver uses the vehicle transmission, accelerator, and brake to reverse the vehicle-trailer combination.

Trailer backup assist functionality is directed to implementing one or more countermeasures for limiting the potential of a jackknife condition being attained between a vehicle and a trailer being towed by the vehicle while backing up. In certain embodiments, curvature of a path of travel of the trailer (i.e., trailer path curvature control) can be controlled by allowing a driver of the vehicle to specify a desired path of the trailer by inputting a desired trailer path curvature as the backup maneuver of the vehicle and trailer progresses.

Figure 1A:
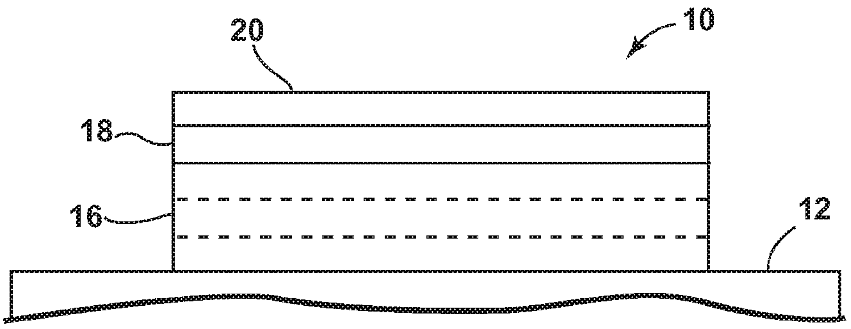
FIG. 1A is a side view of a photoluminescent structure rendered as a coating for use in a luminescent seatbelt assembly according to one embodiment.
Figure 1B:
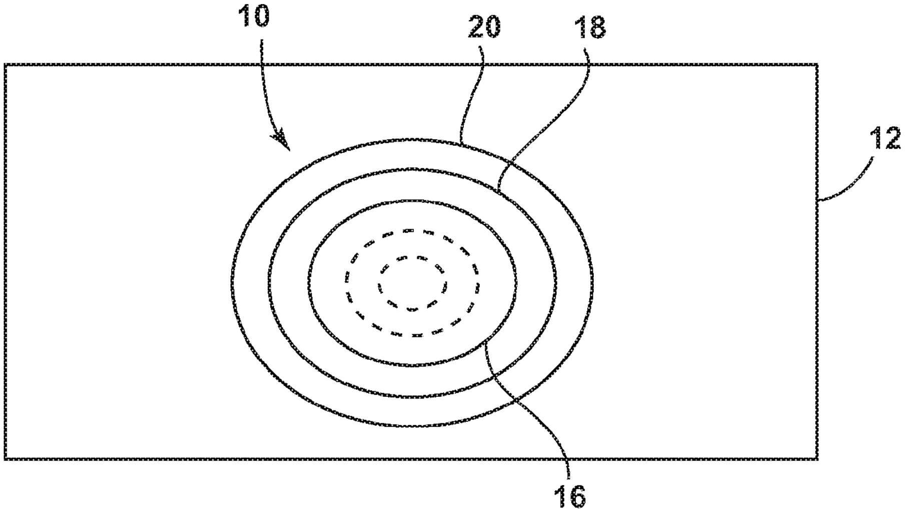
FIG. 1B is a top view of a photoluminescent structure rendered as a discrete particle according to one embodiment.
Figure 1C:
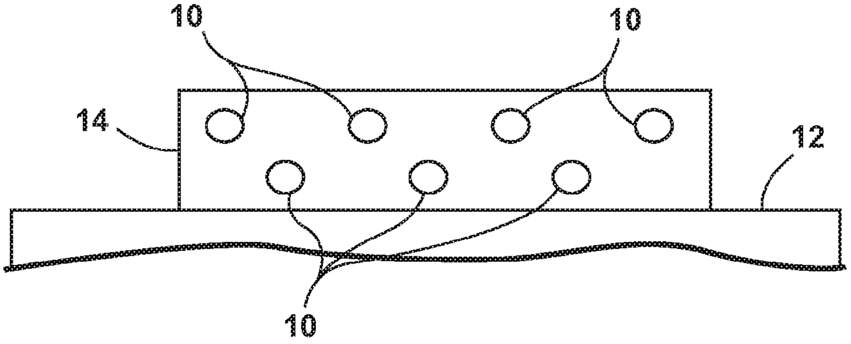
FIG. 1C is a side view a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various implementations discussed herein, each of the photoluminescent structures may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired substrate. The energy conversion layer 16 may be applied to a substrate by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g., the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009;

U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

Figure 3:
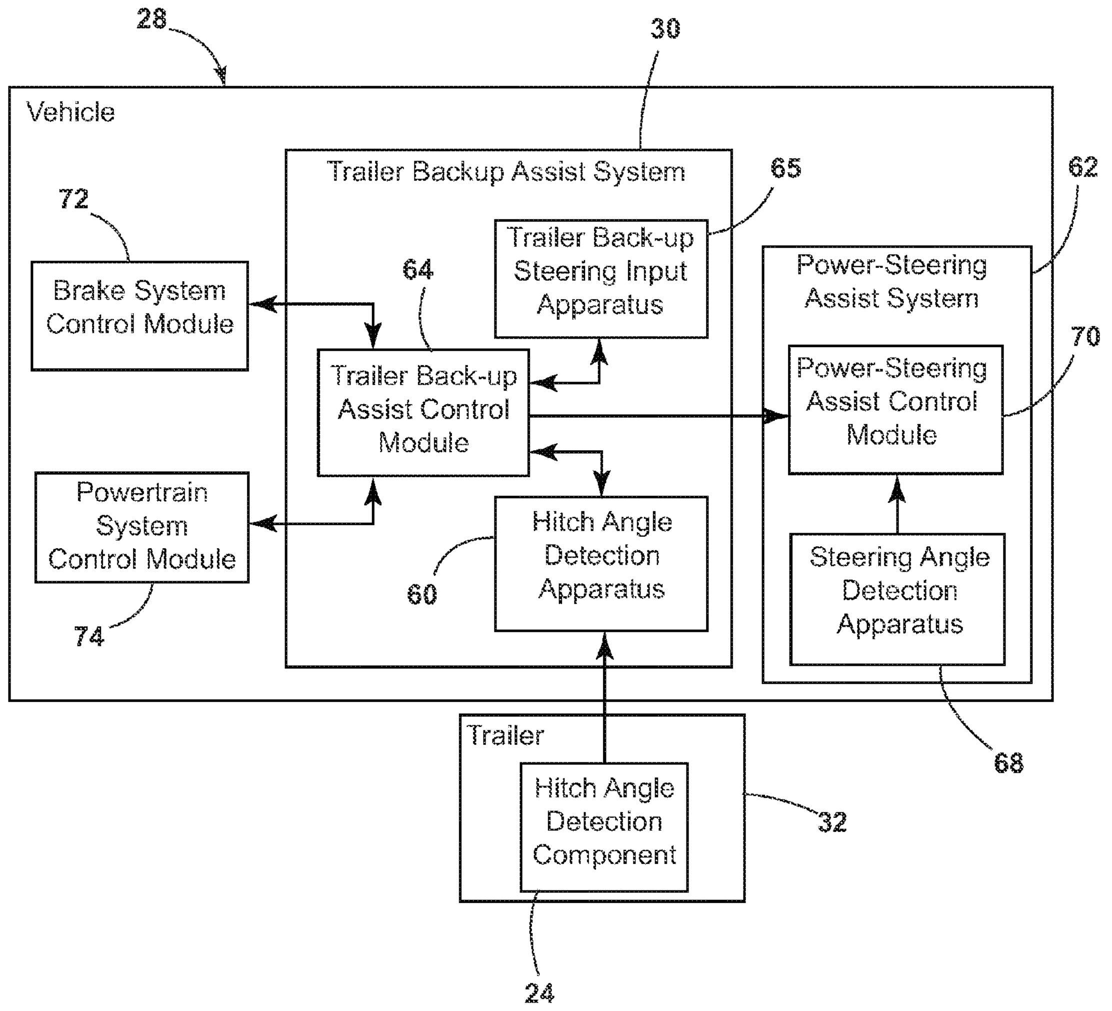
FIG. 3 is a vehicle-trailer combination, the vehicle being configured to perform a trailer backup assist function in accordance with an embodiment.

Referring now to FIG. 2, a lighting system 22 includes a hitch angle detection component 24, such as an image identification feature that may be configured as a trailer target assembly 26 that cooperates with a vehicle 28 to illuminate an area and/or in a pre-defined pattern, according to one embodiment. The vehicle 28 illustrated is shown towing a trailer 32. The target assembly 26 may be used for a plurality of functions, such as assisting a trailer backup assist system 30 (FIG. 3). Additionally, or alternatively, the target assembly 26 may be utilized for monitoring the trailer 32 while the trailer is towed by the vehicle 28 in a forward or rearward direction. Exemplary functions include, but are not limited to, trailer sway monitoring, tire pressure monitoring, or any other desired function that may be sensed by the vehicle 28. The vehicle 28 is in the form of a pick-up truck having a cab 34 and a truck bed 36. A pivotable tailgate 38 is coupled to a rear portion 40 of the truck bed 36.

The vehicle 28 further includes a vehicle hitch connector 42 in the form of a receiver hitch 44 and ball 46. The trailer 32 has a trailer hitch connector 48 in the form of a coupler assembly 56 that may be connected to the vehicle hitch 44. The coupler assembly 56 latches onto the hitch ball 46 to provide a pivoting ball joint. The vehicle 28 is equipped with a video imaging device (e.g., a camera) 50 located in the vehicle tailgate 38 at the rear portion 40 of the vehicle 28. The video imaging camera 50 has an imaging field of view 52 and is located and oriented to capture one or more images of the trailer 32 including a region containing one or more desired target placement zone(s) 54. It should be appreciated that one or more cameras 50 may be located at other locations on the vehicle 28 to acquire images of the trailer 32 and the target placement zone(s) 54. The imaging field of the camera 50 may be configured to view a target-working envelope 58 that is defined by the full range of possible angles between the trailer 32 and vehicle 28 while the trailer 32 is coupled to the vehicle 28. For example, according to one embodiment, the trailer 32 may be disposed in a range of −90 degrees to 90 degrees from an axis extending through the longitudinal centerline of the vehicle 28.

In order to utilize a target assembly 26 on a trailer 32 that is not currently equipped with a suitable pre-existing target assembly 26, a user may place the target assembly 26 onto the trailer 32 within a desired target placement zone 54 so that the camera 50 may capture one or more images of the target assembly 26 to determine trailer related information for the trailer backup assist system 30, such as hitch angle information for the hitch angle detection apparatus 60 (FIG. 3). It should be appreciated that the lighting system 22 described herein may be utilized for any vehicle 28 such as, but not limited to, coupes, sedans, trucks, sport utility, vans, and the like and may cooperate with any type of towable assembly that may be coupled to the vehicle 28. Further, it should be appreciated that any lighting system 22 found elsewhere on the vehicle 28 may also be manufactured in accordance with the principles of the present disclosure.

Referring to FIG. 3, an embodiment of a vehicle 28 configured for performing trailer backup assist functionality is shown. A trailer backup assist system 30 of the vehicle 28 controls the curvature of path of travel of a trailer 32 that is towed by the vehicle 28. Such control is accomplished through interaction of a power-steering assist system 62 of the vehicle 28 and the trailer backup assist system 30.

The trailer backup assist system 30, according to one embodiment, includes a trailer backup assist control module 64, a trailer backup steering input apparatus 66, and a hitch angle detection apparatus 60. The trailer backup assist control module 64 is connected to the trailer backup steering input apparatus 65 and the hitch angle detection apparatus 60 for allowing communication of information therebetween. The trailer backup steering input apparatus 66 may be coupled to the trailer backup assist control module 64 in a wired or wireless manner. The trailer backup assist system control module 64 is attached to a power-steering assist control module 70 of the power-steering assist system 62 for allowing information to be communicated therebetween. A steering angle detection apparatus 68 of the power-steering assist system 62 is connected to the power-steering assist control module 70 for providing information thereto. The trailer backup assist system 30 is also attached to a brake system control module 72 and a powertrain system control module 74 for allowing communication of information therebetween. Jointly, the trailer backup assist system 30, the power-steering assist system 62, the brake system control module 72, the powertrain system control module 74, and a gear selection device (PRNDL), define a trailer backup assist architecture configured in accordance with an embodiment.

The trailer backup assist control module 64 is configured for implementing logic (i.e., instructions) for receiving information from the trailer backup steering input apparatus 66, the hitch angle detection apparatus 60, the power-steering assist control module 70, the brake system control module 72, and the powertrain system control module 74. The trailer backup assist control module 64 (e.g., a trailer curvature algorithm thereof) generates vehicle 28 steering information as a function of all or a portion of the information received from the trailer backup steering input apparatus 66, the hitch angle detection apparatus 60, the power-steering assist control module 70, the brake system control module 72, and/or the powertrain system control module 74. Thereafter, the vehicle 28 steering information is provided to the power-steering assist control module 70 for affecting steering of the vehicle 28 by the power-steering assist system 62 to achieve a commanded path of travel for the trailer 32.

The trailer backup steering input apparatus 66 provides the trailer backup assist control module 64 with information defining the commanded path of travel of the trailer 32 to the trailer backup assist control module 64 (i.e., trailer steering information). The trailer steering information can include information relating to a commanded change in the path of travel (e.g., a change in radius of path curvature) and information relating to an indication that the trailer 32 is to travel along a path defined by a longitudinal centerline axis of the trailer 32 (i.e., along a substantially straight path of travel).

The hitch angle detection apparatus 60, which operates in conjunction with the hitch angle detection component 24 of the trailer 32, provides the trailer backup assist control module 64 with information relating to an angle between the vehicle 28 and the trailer 32 (i.e., hitch angle information). In one embodiment, the hitch angle detection apparatus 60 is a camera-based apparatus such as, for example, an existing rear view camera 50 of the vehicle 28 that images (i.e., visually monitors) the target assembly 26 (i.e., the hitch angle detection component 24) attached the trailer 32 as the trailer 32 is being backed by the vehicle 28. The hitch angle detection component 24 may be a dedicated component (e.g., an item attached to/integral with a surface of the trailer 32 for the express purpose of being recognized by the hitch angle detection apparatus 60). The hitch angle detection apparatus 60 can be configured for detecting a jackknife enabling condition and/or related information (e.g., when a hitch angle threshold has been met).

The power-steering assist control module 70 provides the trailer backup assist control module 64 with information relating to a rotational position (e.g., angle) of the steering wheel angle and/or a rotational position (e.g., turning angle (s)) of steered wheels of the vehicle 28. In some embodiments, the trailer backup assist control module 64 can be an integrated component of the power-steering assist system 62. For example, the power-steering assist control module 70 can include a trailer backup assist algorithm for generating vehicle 28 steering information as a function of all or a portion of information received from the trailer backup steering input apparatus 66, the hitch angle detection apparatus 60, the power-steering assist control module 70, the brake system control module 72, and the powertrain system control module 74.

The brake system control module 72 provides the trailer backup assist control module 64 with information relating to vehicle speed. Such vehicle speed information can be determined from individual wheel speeds as monitored by the brake system control module 72 or may be provided by an engine control module with signal plausibility. Vehicle speed may also be determined from an engine control module. In some instances, individual wheel speeds can also be used to determine a vehicle 28 yaw rate and such yaw rate can be provided to the trailer backup assist control module 64 for use in determining the vehicle 28 steering information. In certain embodiments, the trailer backup assist control module 64 can provide vehicle 28 braking information to the brake system control module 72 for allowing the trailer backup assist control module 64 to control braking of the vehicle 28 during backing of the trailer 32. For example, using the trailer backup assist control module 64 to regulate speed of the vehicle 28 during backing of the trailer 32 can reduce the potential for unacceptable trailer backup conditions. Examples of unacceptable trailer backup conditions include, but are not limited to, a vehicle over speed condition, a high hitch angle rate, trailer 32 angle dynamic instability, a calculated theoretical trailer 32 jackknife condition (defined by a maximum vehicle 28 steering angle, drawbar length, tow vehicle 28 wheelbase and an effective trailer 32 length), or physical contact jackknife limitation (defined by an angular displacement limit relative to the vehicle 28 and the trailer 32), and the like.

The powertrain system control module 74 interacts with the trailer backup assist control module 64 for regulating speed and acceleration of the vehicle 28 during backing of the trailer 32. Regulation of the speed of the vehicle 28 is necessary to limit the potential for unacceptable trailer backup conditions such as, for example, jackknifing and trailer angle dynamic instability.

Figure 4:
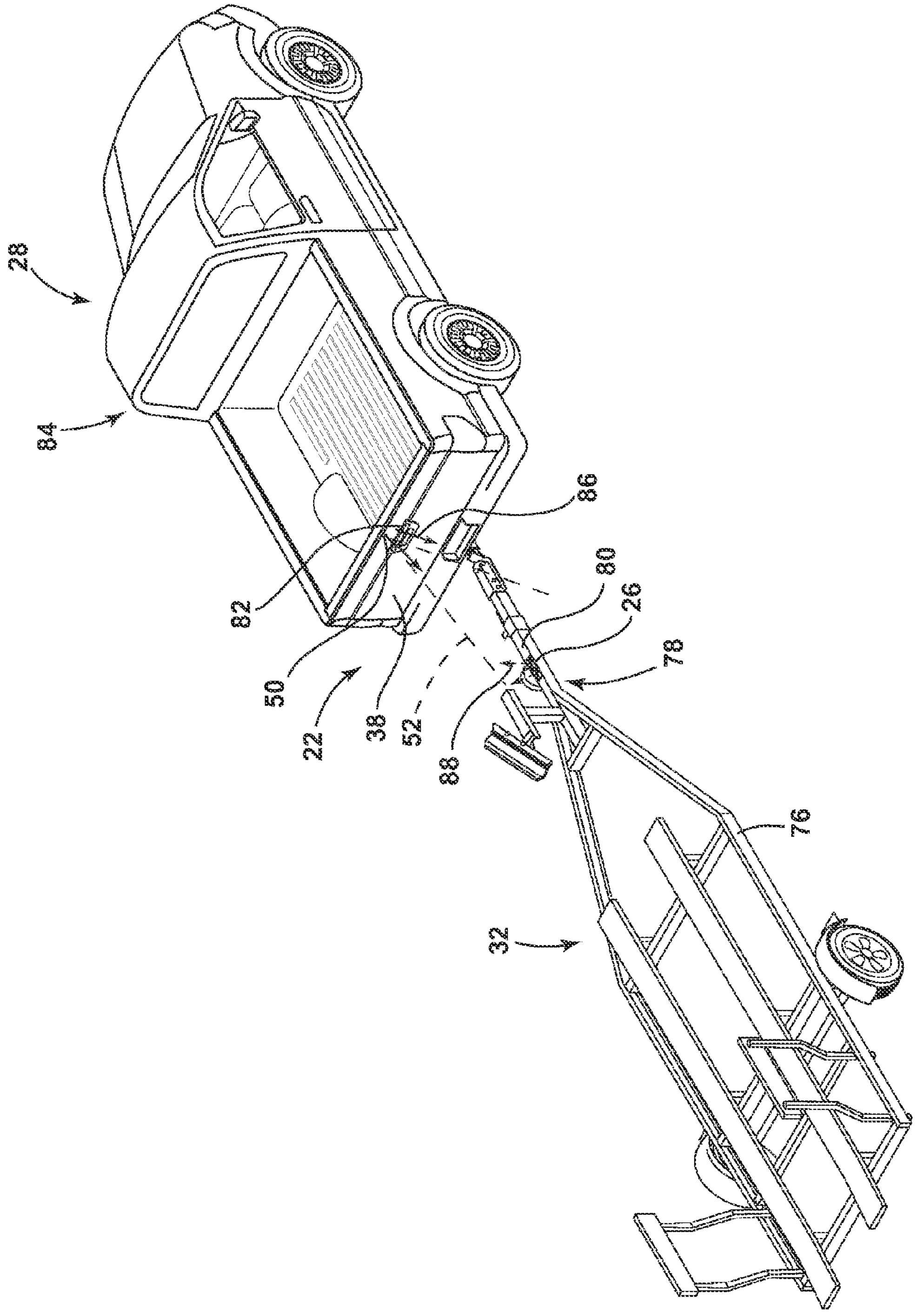
FIG. 4 is a schematic diagram illustrating the lighting system being implemented in the vehicle, wherein the tow vehicle is attached to a trailer and features a trailer backup assist system employing vision based target detection.
Figure 5:
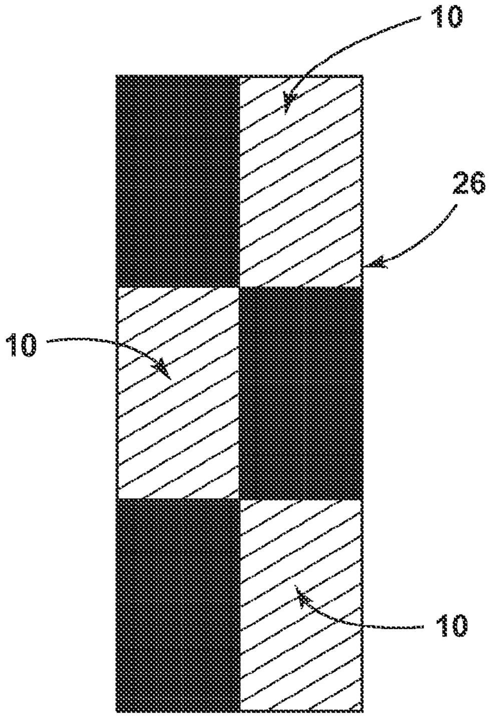
FIG. 5 is a top plan view of a target assembly having photoluminescent structures disposed thereon, according to one embodiment.
Figure 6:
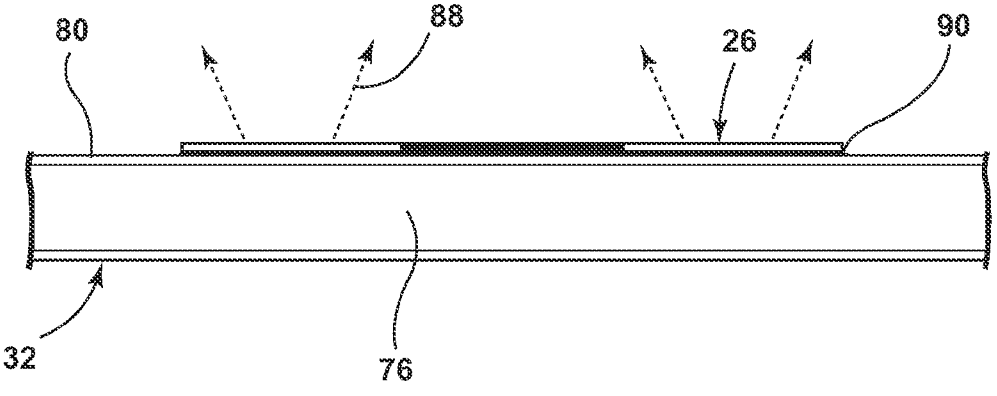
FIG. 6 is an exemplary side view of the target assembly adhered to a portion of the trailer.

Referring to FIGS. 4-6, a trailer 32 is shown coupled to a vehicle 28. The trailer 32 includes a frame 76 including a longitudinally extending bar or trailer tongue 78. A top horizontal surface 80 of trailer tongue 78 is shown providing a target placement zone 54 for receiving the target assembly 26. It should be appreciated that the trailer 32 may be configured in various shapes and sizes and may offer one or more other suitable target placement zones 54 for receiving the target assembly 26. The target placement zone 54 defines at least one desired location for placement of the target assembly 26.

As previously described, the trailer backup assist system 30 may employ a vision based target detection system, wherein the hitch angle detection component 24 is an identifiable visual target located on a trailer 32 attached to a towing vehicle 28. The towing vehicle 28 may be equipped with a rear view camera 50, which functions as the hitch angle detecting apparatus, and is configured to image the target assembly 26 and process acquired image data to generate trailer related information used in a variety of applications associated with the trailer backup assist system 30. Nevertheless, there may be some circumstances that hinder target detection accuracy.

Accordingly, a light source 82 may be disposed on and/or within a portion of the vehicle 28, such as the tailgate 38. The light source 82 may comprise any form of light source. For example fluorescent lighting, light emitting diodes (LEDs), organic LEDs (OLEDs), polymer LEDs (PLEDs), solid state lighting, or any other form of lighting configured to emit light may be utilized. As illustrated in FIG. 4, the light source 82 is disposed on the tailgate 38 and is oriented to emit inputted light 86 rearwardly towards the target assembly 26. The light source 82 may be an independent light source 82 configured for utilization during the illumination of a target assembly 26 or, alternatively, may be used for a plurality of functions, such as, but not limited to, as a device for illuminating an area rearward of the vehicle 28, a feature on the tailgate of the vehicle 28, or the license plate on the vehicle 28. Alternatively still, the light source 82 may be disposed in a vehicle 28 light assembly and may simultaneously be utilized as an illumination source for the target assembly 26 and as a backup light, a running light, or a brake light.

Additionally, the light source 82 may include optics configured to disperse or focus inputted light 86 being emitted therefrom to further illuminate the target assembly 26. For example, optics may be utilized for directing a first portion of inputted light 86 emitted from the light source 82 towards the target assembly 26. A second portion of inputted light 86 emitted from the light source 82 may be directed towards a feature on the rearward of the vehicle 28 or on the trailer 32. It should be appreciated that the light source 82 may be located on any surface.

In operation, the light source 82 may be activated using a variety of means. For example, the lighting system 22 may include a user interface 84 on and/or within the vehicle 28. The user interface 84 may be configured such that a user may control the wavelength of inputted light 86 that is emitted by the light source 82 and/or the portions of the light source 82 that are illuminated. Alternatively, the user interface 84 may be used to switch the lighting system 22 through a plurality of modes and/or functions. The user interface 84 may use any type of control known in the art for control the light source 82, such as, but not limited to, switches (e.g., proximity sensors, push-type buttons) and may be disposed in any practicable location. Additionally, or alternatively, the light source 82 may be automatically activated via an onboard vehicle system such as the trailer backup assist system 30 and/or other vehicle system. For instance, when performing a backup maneuver, the trailer backup assist system 30 may activate the light source 82. It is contemplated that the lighting system 22 may have a wide range of target assembly 26 locations such that the lighting system 22 may be used for a plurality of functions. Exemplary functions include usage as a target, ambient lighting, and/or a lamp that provides illumination to an area proximate the trailer hitch connector 48.

According to one embodiment, the light source 82 includes a flexible circuit board (e.g., a copper flexible circuit) that is coupled to, attached to, or disposed on the vehicle 28. In such an arrangement, the flexible circuit board may flex in conjunction with the body of the vehicle 28 to allow the lighting system 22 to be contoured with any desired style and/or a plurality of target placement zones 54. Alternatively, the light source 82 may be mounted within the body panel and emit inputted light 86 through a portion thereof toward the target working envelope 58.

A photoluminescent structure 10 containing at least one photoluminescent material is configured to illuminate in response to inputted light 86 emitted from the light source 82. More specifically, inputted light 86 emitted from the light source 82 towards the target assembly 26 may be converted by the photoluminescent structure 10 and re-emitted as outputted light 88 having a different wavelength, typically in the visible spectrum. According to the illustrated embodiment, the target assembly 26 location is an area disposed proximate to the vehicle 28.

More specifically, the photoluminescent material is formulated to have an absorption spectrum that includes the emission wavelength of the inputted light 86 supplied from the light source 82. The photoluminescent material is also formulated to have a Stokes shift resulting in the converted visible light 88 having an emission spectrum expressed in a desired color, which may vary per lighting application. The converted visible light 88 is outputted from the light source 82 via the viewable portion 124, thereby causing the viewable portion 124 to illuminate in the desired color. In one embodiment, the energy conversion process is undertaken by way of down conversion, whereby the inputted light 86 includes light on the lower end of the visibility spectrum such as blue, violet, or ultraviolet (UV) light. Doing so enables blue, violet, or UV LEDs to be used as the light source 82, which may offer a relative cost advantage over simply using LEDs of the desired color and foregoing the energy conversion, process altogether. Moreover, it is contemplated that blue LEDs may be utilized, which may run at a much higher intensity to compensate for dirt, snow, rain, etc. than white LEDs. Also, the utilization of blue LEDs may reduce rearward glare due to relative insensitivity of human eye to blue light so that the target assembly 26 may brilliantly illuminate. Furthermore, the illumination provided by the viewable portion 124 may offer a unique, substantially uniform, and/or attractive viewing experience that may be difficult to duplicate through non-photoluminescent means.

Inputted light 86 emitted from the light source 82 may be converted by the photoluminescent structure 10 and re-emitted as outputted light 88 having a different wavelength, typically in the visible spectrum. Such a configuration may assist a trailer backup assist system 30 by creating a more visible target assembly 26 in low lighting conditions and through the plurality of orientations between the trailer 32 and vehicle 28 as the target assembly 26 is actively illuminated with a diffused, non-glared light. Such a configuration may be desirable for the camera 50 because the target assembly 26 may emit outputted light 88 rather than reflecting light off the target assembly 26 for the camera 50.

As described above, the photoluminescent structure 10 may convert the inputted light 86 emitted from the light source 82 from a first wavelength to a second wavelength. Accordingly, the target assembly 26 may illuminate, rather than reflect light from a light source 82 on a vehicle 28 thereby making the target assembly 26 much more visible to the camera 50. Additionally, the photoluminescent structure 10 may also substantially uniformly diffuse outputted light 88 from the target. In one embodiment, the energy conversion process is undertaken by way of down conversion, whereby the inputted light 86 includes light on the lower end of the visibility spectrum such as blue, violet, or ultraviolet (UV) light. Doing so enables blue, violet, or UV LEDs to be used, which may offer a relative cost advantage over simply using LEDs of the desired color. Furthermore, the illumination provided may offer a unique, substantially uniform, and/or attractive viewing experience that may be difficult to duplicate through non-photoluminescent means. Alternatively, a white LED with a high blue content may be used such that the light source 82 may illuminate an area behind the vehicle 28 and/or excite the photoluminescent structure 10.

According to one embodiment, the trailer backup system 30 may monitor the target assembly 26 while the vehicle 28 is moving in a forward direction through the utilization of blue LEDs. Under the Federal Motor Vehicle Safety Standards, white light emittance while the vehicle 28 is moving in a forward direction is prohibited. However, inputted light 86 having a wavelength that may be in the non-visible spectrum may be utilized during operation and may provide illumination of the target assembly 26 during operation. For example, the camera 50 may monitor the target assembly 26 during forward movement and be configured to alert an occupant of the vehicle 28 if the target assembly 26 changes orientation, which may be an indication of an issue with the trailer 32.

As shown in FIGS. 5 and 6, the target assembly 26 may include an adhesive 90 on the bottom surface and a predetermined image pattern of a certain size and shape provided on the top surface for capture by the video camera 50 and recognition by the image processing. The target assembly 26 may have a rectangular shape, according to one embodiment, and may have a camera image recognizable pattern such as the checker pattern shown. The image processing may include known image pattern recognition routines 134 (FIG. 10) for identifying a target pattern and its location on a trailer 32. However, it should be appreciated that other target assembly 26 shapes, sizes, and patterns may be employed. It should further be appreciated that the target assembly 26 may otherwise be connected to the trailer 32 using connectors, such as fasteners, which may connect to the trailer 32 or to an attachment to the trailer 32. It should further be appreciated that the target assembly 26 can be attached via magnet, glued on, painted on, or any number of other suitable means.

According to one embodiment, the target assembly 26 is a molded component and an overmold material 66 is disposed thereover. To form the target assembly 26, a single or plurality of polymers may be utilized. Further, according to one embodiment, the target assembly 26 may be fabricated from molding techniques such as dual injection molding, two-shot molding, two-color molding, two-component molding, and/or multi-shot molding.

In embodiments where the overmold material 66 is cured under pressure, the overmold material 66 may be applied to the target assembly 26 in a partly cured condition. In one embodiment, the over molding process includes applying the overmold material 66 onto at least a part of the target assembly 26 by spraying, brushing, dipping, printing, laminating or rolling, followed by curing the overmold material 66. In some embodiments, the overmold material 66 may include a polymeric material, silicon, urethane material, vinyl, and/or any other material that may be advantageous or structurally sound for placement within a zone that is regularly contacted and prone to environmental debris. Moreover, in some embodiments, the overmold material 66 may be transparent or translucent and may provide light diffusing and/or anti-glare characteristics. It should be appreciated that the overmold material 66 may be disposed over any and/or all components of the lighting system 22 such that the overmold material 66 may encapsulate all of the components into a single piece that may be applied, attached, or otherwise coupled to the desired target zone 54.

Although the lighting system 22 has been described herein as being featured in a tow vehicle 28 generally embodied as a pickup truck, it should be appreciated that the lighting system 22 may be featured in other tow and non-tow vehicles 28 alike, which may include, but are not limited to, buses, sports utility vehicles, vans, station wagons, sedans, and coupes. Furthermore, while the lighting system 22 is intended for use with the trailer backup assist system 30, it should be appreciated that the vehicle lighting system 22 may additionally, or alternatively, be adapted for use with other vehicle related applications. For example, the additional lighting provided by the lighting system 22 may enable a vehicle 28 equipped with a rear view camera 50 system to render clearer images on a display screen when it's dark outside. This may prove especially useful when performing a backup maneuver in low visibility situations. At the most basic level, the lighting system 22 may simply be used as a utility light. For example, the lighting system 22 may be activated to aid an operator with attaching/detaching a trailer 32 to/from a tow vehicle 28 in low light conditions.

Figure 7:
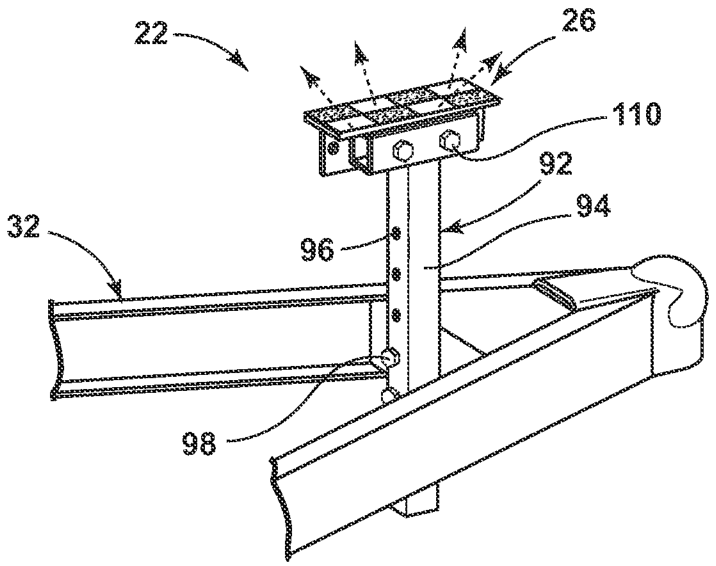
FIG. 7 is a schematic view of a front portion of the trailer having a target mounting system assembled thereto, according to one embodiment.
Figure 8:
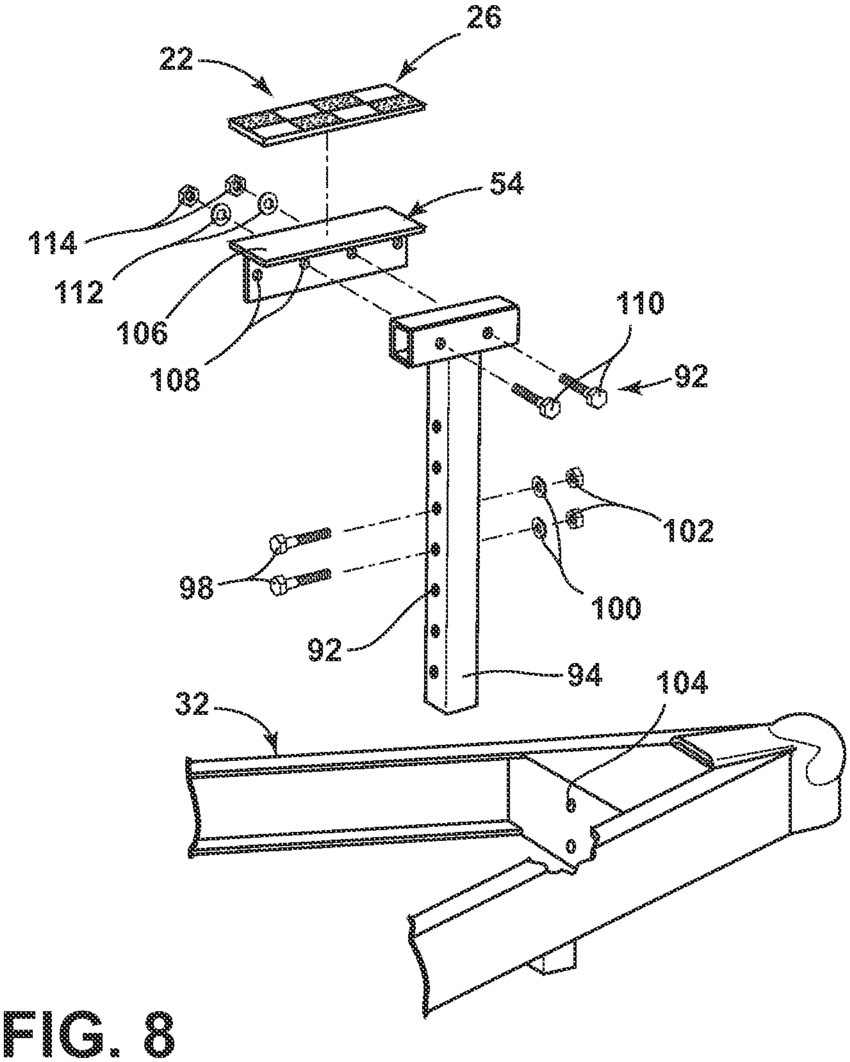
FIG. 8 is an exploded view of the target mounting system and trailer shown in FIG. 7.

Referring to FIGS. 7-8, a target assembly 26 location may be added to a given trailer 32 by use of a target mounting system 92, according to one embodiment. The target mounting system 92 is shown installed onto the trailer 32 to present a target assembly 26 that is viewable by the camera 50 within a desired target placement zone 54. The target mounting system 92 includes a vertical mounting bracket 94 having a plurality of bolt receiver holes 96 extending vertically to allow for a desired vertical height adjustment. The bracket 94 may be assembled onto the trailer 32 via holes using bolts 98, washers 100, and nuts 102. The height of the bracket 94 may be adjusted depending on which holes are aligned with the trailer holes 104. Mounted to the top of the bracket 94 is a target plate 106 having a top target placement zone 54 onto which the target assembly 26 is located. The plate 106 likewise has a plurality of holes 108 that align horizontally with the holes in the bracket 94 and may be assembled thereto via bolts 110, washers 112, and nuts 114. Accordingly, the plate 106 may be adjusted both vertically and horizontally to a desired position so as place the target assembly 26 adjustably within a desired location so that the target assembly 26 is easily acquired by the camera 50 and processed by the image processing.

Figure 9:
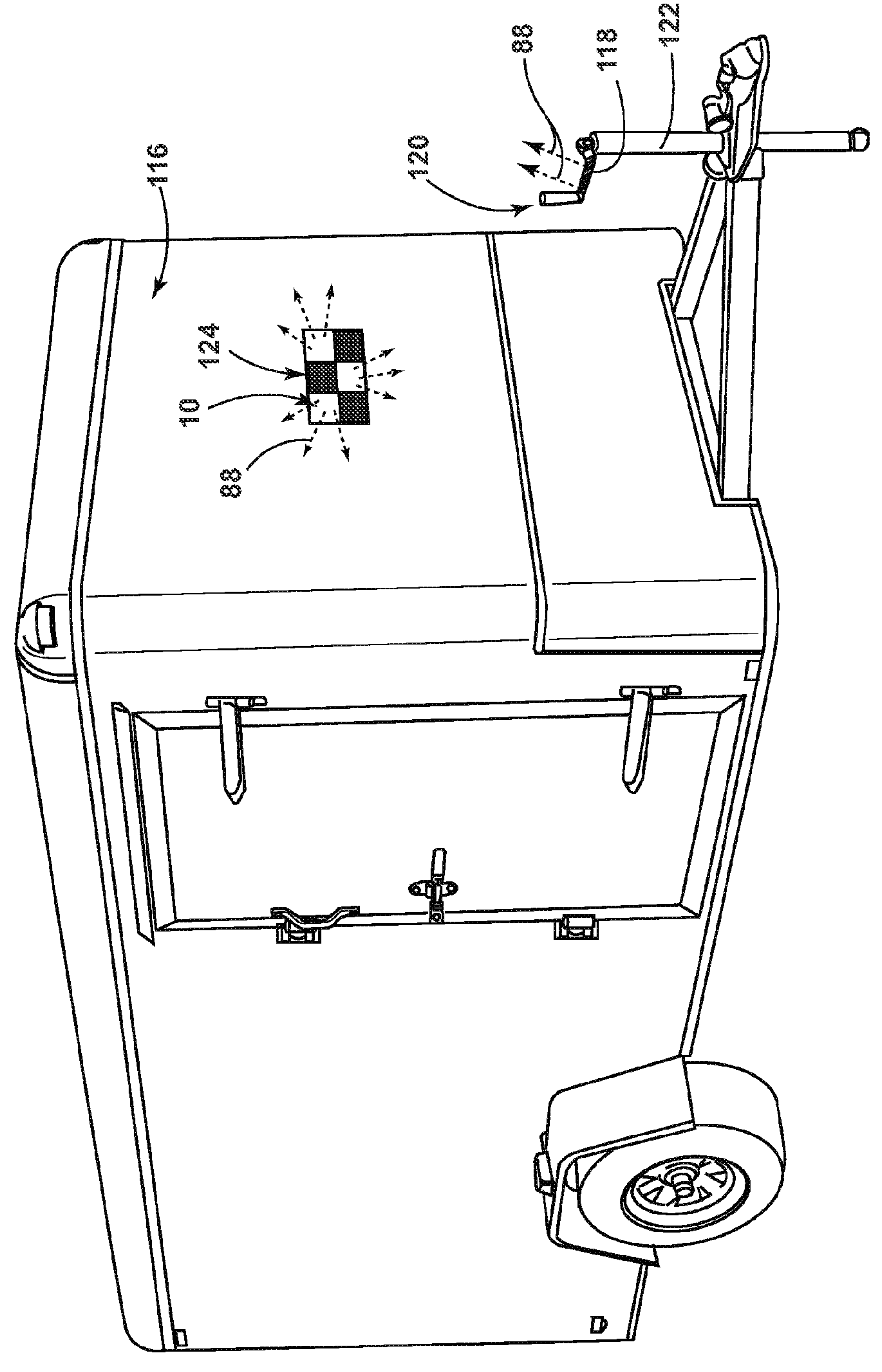
FIG. 9 is an exemplary perspective view of the lighting system employed on a vertical portion of an enclosed trailer.

As shown in FIG. 9, the target assembly 26 is configured to attach to a forwardly, vertical surface 116 of an enclosed trailer 32. As illustrated, a second photoluminescent structure 118 is disposed on a feature 120 of the trailer 32, such as a portion of a jack 122 coupled to the trailer 32. As described above, the light source 82 emits inputted light 86 towards the photoluminescent structures 10, 118, which converts the inputted light 86 to outputted light 88 of a different wavelength. The outputted light 88 may be used as welcome/farewell sequence light, ambient light, illumination for any feature 120 of the vehicle 28 or the trailer 32, and/or a warning indicator.

As described above, the energy conversion layer 16 of the photoluminescent structure 10 may include at least one photoluminescent material having energy converting elements with phosphorescent or fluorescent properties. For example, the photoluminescent material may include organic or inorganic fluorescent dyes including rylenes, xanthenes, porphyrins, phthalocyanines. Additionally, or alternatively, the photoluminescent material may include phosphors from the group of Ce-doped garnets such as YAG:Ce.

As illustrated in FIG. 9, the target assembly 26 may be attached, coupled, and/or over molded to a vertical surface 116 of the trailer 32. According to one embodiment, the target assembly 26 is flushly mounted to the trailer 32 thereby partially concealing from view in the unilluminated state. Additionally, the lighting system 22 and/or one or more components thereof have a soft conformable encapsulation layer to both protect the lighting system 22 and to limit flexing of portions of the lighting system 22. Exemplary materials that may be utilized include, but are not limited to, polyvinyl chloride, vulcanized thermoplastic elastomer, and polyester elastomer.

As discussed above, the target assembly 26 may include a viewable portion 124 that is arranged over the photoluminescent structure 10, and may be formed by the encapsulation layer. In some embodiments, the viewable portion 124 may include a plastic, silicon, or urethane material and is molded over the photoluminescent structure 10 and/or any other component of the target assembly. Preferably, the viewable portion 124 should be at least partially light transmissible. In this manner, the viewable portion 124 will be illuminated by the photoluminescent structure 10 whenever an energy conversion process is underway. Additionally, by over-sealing the viewable portion 124, it may also function to protect the photoluminescent structure 10 and or any other components of the target assembly 26. The viewable portion 124 may be arranged in a planar shape and/or an arcuate shape to enhance its viewing potential when in a luminescent state.

With respect to the presently illustrated embodiment, the excitation of photoluminescent materials may be mutually exclusive. That is, the first and second photoluminescent materials are formulated to have non-overlapping absorption spectrums and Stoke shifts that yield different emission spectrums. Also, in formulating the photoluminescent materials, care should be taken in choosing the associated Stoke shifts such that the converted light 88 emitted from one of the photoluminescent materials, does not excite the other, unless so desired. According to one exemplary embodiment, a first portion of the light source 82 is configured to emit an inputted light 86 having an emission wavelength that only excites the first photoluminescent material and results in the inputted light 86 being converted into a visible light 88 of a first color (e.g., white). Likewise, a second portion of the light source 82, is configured to emit an inputted light 86 having an emission wavelength that only excites second photoluminescent material and results in the inputted light 86 being converted into a visible light 88 of a second color (e.g., red). The first and second colors may be visually distinguishable from one another. In this manner, the light source 82 may be selectively activated using a controller 128 to cause the photoluminescent structure 10 to luminesce in a variety of colors. For example, the controller 128 may activate the light source 82 to exclusively excite the first photoluminescent material, resulting in the viewable portion 124 illuminating in the first color. Alternatively, the controller 128 may activate the light source 82 to exclusively excite the second photoluminescent material, resulting in the viewable portion 124 illuminating in the second color.

Alternatively still, the controller 128 may activate the light source 82 to cause both of the photoluminescent materials to become excited, resulting in the viewable portion 124 illuminating in a third color, which is a color mixture of the first and second color (e.g., pinkish). The intensities of the inputted light 86 emitted from the light source 82 may also be proportionally varied by wavelength to one another such that additional colors may be obtained. For energy conversion layers 16 containing more than two distinct photoluminescent materials, a greater diversity of colors may be achieved. Contemplated colors include red, green, blue, and combinations thereof, including white, all of which may be achieved by selecting the appropriate photoluminescent materials and correctly manipulating the corresponding light source 82.

Figure 10:
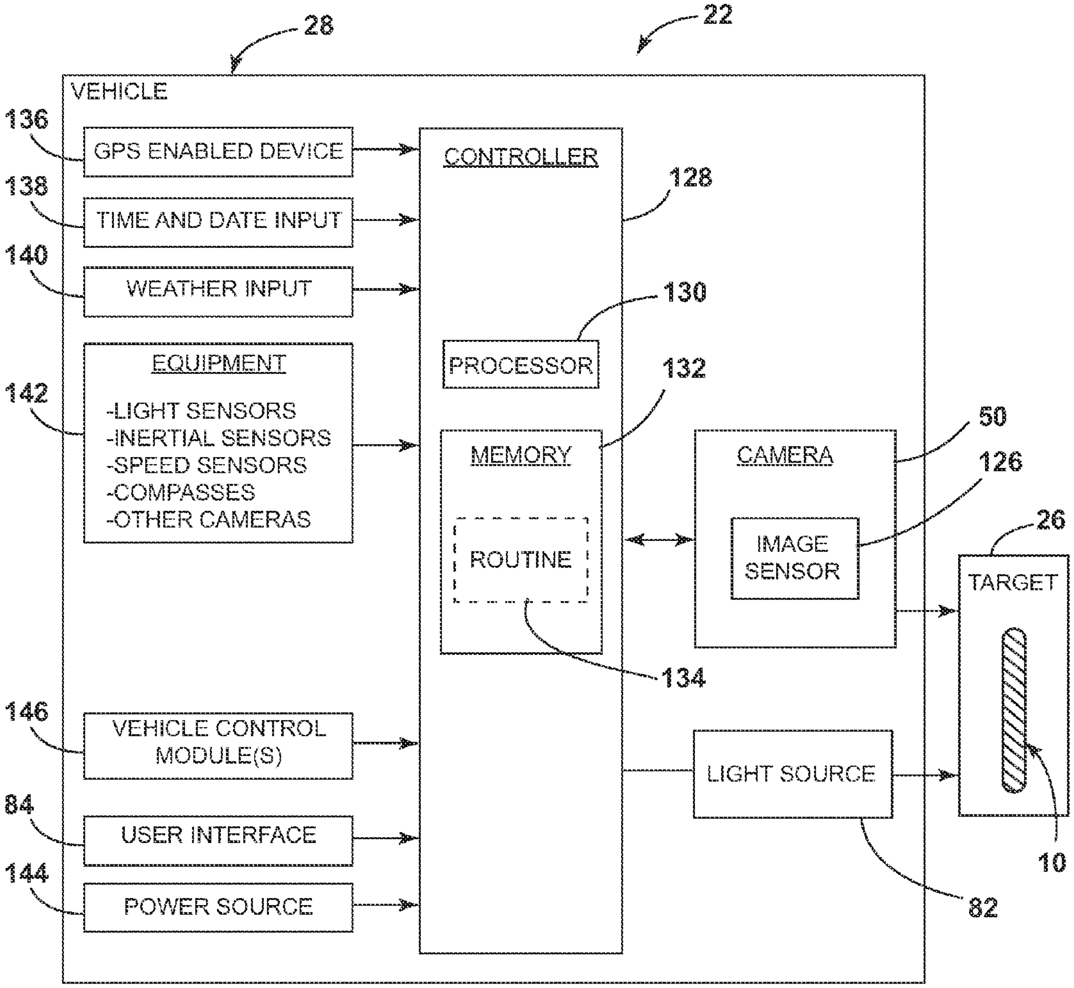
FIG. 10 is a block diagram of the vehicle and the lighting system.

Referring to FIG. 10, a lighting system 22 is shown, according to one embodiment, and is intended for use with the trailer backup assist system 30. The lighting system 22 includes a camera 50 having an image sensor 126 that captures light and converts it into image data. The camera 50 can be mounted to the rear of a tow vehicle 28 and positioned to image a target assembly 26 located on a trailer 32 that is attached to the vehicle 28. The target assembly 26 may be configured in a rectangular configuration having a checker pattern that is recognizable by the camera 50. In one embodiment, the checker pattern may incorporate a plurality of photoluminescent structures having varying photoluminescent materials therein such that the photoluminescent structures illuminate in a first color and a second color that is different than the first color, as described above.

The lighting system 22 further includes a controller 128 that may be integrated with the camera 50 or located external thereto. The controller 128 can include circuitry such as a processor 130 and memory 132. A routine 134 for adjusting an image capture setting can be stored in the memory 132 and is executed by the processor 130. In one embodiment, the controller 128 is configured to set a reference point corresponding to an area of the target assembly 26 or trailer 32 that has a known color and a known intensity. By knowing how the reference point should appear in a captured image, the controller 128 can analyze image data received from the camera 50 and adjust the white balance and exposure of the camera 50 to compensate for changing light conditions such as when the vehicle 28 and trailer 32 move from a sunny area to a shaded area. Alternatively, the target assembly 26 and light source 82 may vary in lighting intensity to compensate for environmental factors thereby providing a uniform intensity of emitted light 86, 88 from the target assembly 26.

With respect to the illustrated embodiment, the controller 128 can also communicate with a positioning device 136, shown as a GPS enabled device to receive input related to the geographical location of the vehicle 28 and trailer 32. The GPS enabled device can be any suitable device capable of communicating with the controller 128. In one embodiment, the GPS enabled device is an onboard device such as, but not limited to, a Human Machine Interface (HMI). In another embodiment, the GPS enabled device is a portable electronic device such as, but not limited to, a portable GPS device or a GPS enabled smart device, both capable of wirelessly communicating with the controller 128 via Bluetooth®, Wi-Fi, the like, or a combination thereof. Since light conditions may vary depending on one's geographical location, the controller 128 can give consideration to the locational input supplied by the GPS enabled device in deciding whether an adjustment to the camera 50 and/or intensity of light emitting from the light source 82 is needed.

Since light conditions may also vary depending on the current time, date, and weather conditions, the controller 128 can additionally receive time and date information via input 138 and weather information via input 140, which may either or both be considered by the controller 128 in deciding whether an adjustment to the light source 82 is needed. For example, the light intensity in Florida during a clear summer afternoon will generally be higher than the light intensity in Michigan during an overcast summer morning. Thus, by making this type of information known to the controller 128, the controller 128 can predict certain characteristics related to the light captured by the image sensor 188 of the camera 50 and adjust the image capture settings of the camera 50 and/or light source 82 accordingly. Per the previously given example, if a vehicle 28 and trailer 32 are located in Florida, the controller 128 may choose to decrease the intensity of light emitted from the light source 82 whereas the controller 128 may choose to increase the intensity of light emitted from the light source 82 if the vehicle 28 and trailer 32 are located in Michigan. It is contemplated that the controller 128 can receive the time and date information via the GPS enabled device, a portable electronic device, the electronic control module (ECM) of the vehicle 28, or any other suitable means. The weather information may be supplied to the controller 128 via an application running on a portable electronic device or an onboard device (e.g. HMI), or any other suitable means.

In addition to the abovementioned inputs 198, 200, the controller 128 may receive input from one or more equipment 142 located on the vehicle 28 and/or the trailer 32, which includes, but is not limited to, light sensors, speed sensors, inertia sensors, directional compasses, and/or other cameras 50, which can be provided in front, rear, and side facing configurations. By leveraging some or all of the equipment 142 with other devices and inputs described previously, the controller 128 can determine the orientation of the vehicle 28 and the trailer 32 relative to a light source 82, such as the sun.

According to one embodiment, the lighting system 22 is configured to compensate for changing light conditions caused when the rear vehicle lights of the vehicle 28 are activated. The rear lights may include taillights, brake lights, supplemental lights, and other forms of rear lighting. When activated, the rear lights may project light upon the imaged scene, thereby causing a sudden change in lighting conditions. If unaccounted for, the lighting system 22 may experience difficulty tracking the target assembly 26, thus the light source 82 intensity may adjust to compensate for such conditions.

According to one embodiment, the controller 128 may also provide electrical power to the lighting system 22 via a power source 144 located onboard the vehicle 28. In addition, the controller 128 may be configured to control the inputted light emitted from each light source 82 based on feedback received from one or more vehicle control modules 146 such as, but not limited to, a body control module, engine control module, steering control module, brake control module 72, the like, or a combination thereof. By controlling the inputted light 86 emitted from the light source 82, the lighting system 22 may illuminate in a variety of colors and/or patterns to provide an aesthetic appearance, or may provide vehicle information to an intended observer. For example, when the lighting system 22 is illuminated, the lighting system 22 may notify an occupant of the vehicle 28 about a specific condition of the vehicle 28. It should be appreciated, however, that the target assembly 26 may include an independent controller 128 therein for implementing the functions described herein.

In operation, the photoluminescent structure 10 may exhibit periodic unicolor or multicolor illumination. For example, the controller 128 may prompt the light source 82 to periodically emit only the first wavelength of inputted light 86 via the light source 82 to cause the photoluminescent structure 10 to periodically illuminate in the first color. Alternatively, the controller 128 may prompt the light source 82 to periodically emit only the second wavelength of inputted light 86 via light source 82 to cause the photoluminescent portion to periodically illuminate in the second color. Alternatively, the controller 128 may prompt the light source 82 to simultaneously and periodically emit the first and second wavelengths of inputted light 86 to cause the photoluminescent structure 10 to periodically illuminate in a third color defined by an additive light mixture of the first and second colors. Alternatively still, the controller 128 may prompt the light source 82 to alternate between periodically emitting the first and second wavelengths of inputted light 86 to cause the photoluminescent structure 10 to periodically illuminate by alternating between the first and second colors. The controller 128 may prompt the light source 82 to periodically emit the first and/or second wavelengths of inputted light 86 at a regular time interval and/or an irregular time interval.

In another embodiment, the lighting system 22 may include a user interface 84. The user interface 84 may be configured such that a user may control the wavelength of inputted light 86 that is emitted by the light source 82. Such a configuration may allow a user to control which features 178 (FIG. 7) are illuminated.

With respect to the above examples, the controller 128 may modify the intensity of the emitted first and second wavelengths of inputted light 86 by pulse-width modulation or current control. In some embodiments, the controller 128 may be configured to adjust a color of the emitted light by sending control signals to adjust an intensity or energy output level of the light source 82. For example, if the light source 82 is configured to emit the inputted light at a low level, substantially all of the inputted light may be converted to the outputted light. In this configuration, a color of light corresponding to the outputted light may correspond to the color of the emitted, outputted light from the lighting system 22. If the light source 82 is configured to output the inputted light at a high level, only a portion of the inputted light may be converted to the outputted light. In this configuration, a color of light corresponding to mixture of the inputted light and the outputted light may be output as the emitted light. In this way, each of the controllers 128 may control an output color of the emitted light.

Though a low level and a high level of intensity are discussed in reference to the inputted light of inputted light 86, it shall be understood that the intensity of the inputted light may be varied among a variety of intensity levels to adjust a hue of the color corresponding to the emitted light from the lighting system 22. The variance in intensity may be manually altered or automatically varied by the controller 128 based on pre-defined conditions. According to one embodiment, a first intensity may be output from the lighting system 22 when a light sensor senses daylight conditions. A second intensity may be output from the lighting system 22 when the light sensor determines the vehicle 28 is operating in a low light environment.

As described herein, the color of the outputted light 88 may be significantly dependent on the particular photoluminescent materials utilized in the photoluminescent structure 10. Additionally, a conversion capacity of the photoluminescent structure 10 may be significantly dependent on a concentration of the photoluminescent material utilized in the photoluminescent structure 10. By adjusting the range of intensities that may be output from the light source 82, the concentration, types, and proportions of the photoluminescent materials in the photoluminescent structure 10 discussed herein may be operable to generate a range of color hues of the emitted light by blending the first, inputted light 86 with the second, outputted 88 wavelength.

Accordingly, a lighting system configured as a trailer hitch angle detection component that cooperates with a vehicle is configured to illuminate an area and/or in a pre-defined pattern for recognition by the vehicle has been advantageously provided herein. The lighting system retains its structural properties while providing luminescent light having both functional and decorative characteristics.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A lighting system for a trailer towed by a vehicle, comprising:

a hitch angle detection component disposed on the trailer having a predetermined image pattern provided for capture by an imaging device and recognition by an image processing unit;

a light source disposed on the vehicle; and a photoluminescent structure forming the image pattern through a plurality of portions having the photoluminescent structure therein on the detection component and configured to luminesce in response to excitation by the light source.

2. The lighting system for a trailer of claim 1, wherein the hitch angle detection component includes a predetermined image pattern of a certain size and shape.

3. The lighting system for a trailer of claim 2, wherein the photoluminescent structure comprises at least one photoluminescent material configured to down convert an inputted light received from at least a portion of the light source into a visible light that is outputted to a viewable portion.

4. The lighting system for a trailer of claim 3, wherein the inputted light comprises one of blue light, violet light, and UV light.

5. The lighting system for a trailer of claim 1, wherein the hitch angle detection component is configured as a target.

6. The lighting system for a trailer of claim 5, wherein the target cooperates with a trailer backup assist function of a vehicle.

7. The lighting system for a trailer of claim 1, wherein the light source is configured to vary an intensity of inputted light based on environmental characteristics of the detection component.

8. A lighting system for a trailer, comprising:

a light source on a vehicle;

a target assembly on a trailer having a first luminescent structure thereon and configured to luminesce in response to excitation by the light source; and an imaging device, wherein the light source is configured to emit varied intensities of inputted light based on environmental characteristics such that the imaging device captures a redefined intensity of luminescence from the first luminescent structure.

9. The lighting system of claim 8, wherein target assembly includes a predetermined image pattern of a certain size and shape provided through a surface thereof for capture by an imaging device and recognition by an image processing unit.

10. The lighting system of claim 8, wherein the light source emits inputted light in the blue spectrum and the first luminescent structure converts the inputted light to outputted light of a different wavelength.

11. The lighting system of claim 8, further comprising:

a second luminescent structure disposed on a feature proximate to the light source.

12. The lighting system of claim 11, wherein the first luminescent structure illuminates in a first color and the second luminescent structure illuminates in a second color.

13. The lighting system of claim 11, wherein the first and second luminescent structures are disposed in a checkered pattern on the target assembly.

14. The lighting system of claim 8, wherein the light source emits inputted light rearwardly of the vehicle as the vehicle moves forwardly.

15. A lighting system for a trailer assembly having a trailer towed by a vehicle, comprising:

a hitch angle detection component located on the trailer;

a light source powered by the vehicle and configured to emit non-visible light while the vehicle is moving in a forward direction; and a photoluminescent structure disposed on the detection component and configured to luminesce in response to excitation by light output from the light source.

16. The lighting system for a trailer assembly of claim 15, further comprising:

an imaging device capturing images of the detection component.

17. The lighting system for a trailer assembly of claim 16, wherein the pattern is captured by the imaging device and recognized by an image processing unit.

18. The lighting system for a trailer assembly of claim 15, further comprising:

a controller configured to control the inputted light emitted from the light source.

19. The lighting system for a trailer assembly of claim 18, further comprising:

a sensor configured to monitor an intensity of outputted light emitted from the photoluminescent structure, wherein the controller varies the intensity of light emitted from the light source based on the intensity of measured outputted light.

20. The lighting system for a trailer assembly of claim 15, wherein the light source is illuminated when a vehicle transmission is placed in reverse and returns to an unilluminated state when the vehicle is removed from a reverse position.

* * * * *

UNITED STATES PATENT AND TRADEMARK OFFICE
CERTIFICATE OF CORRECTION

PATENT NO. : 9,464,886 B2
APPLICATION NO. : 14/820999
DATED : October 11, 2016
INVENTOR(S) : Salter et al.

It is certified that error appears in the above-identified patent and that said Letters Patent is hereby corrected as shown below:

In the Claims

Column 18:

Claim 8, Line 4:

"redefined" should be --predefined--.

Signed and Sealed this
Third Day of January, 2017

Michelle K. Lee
*Director of the United States Patent and Trademark Office*